Jan. 23, 1940. A. J. DUAEI ET AL 2,188,001
PIPE LINE COATING MACHINE
Filed Oct. 18, 1937 4 Sheets-Sheet 3
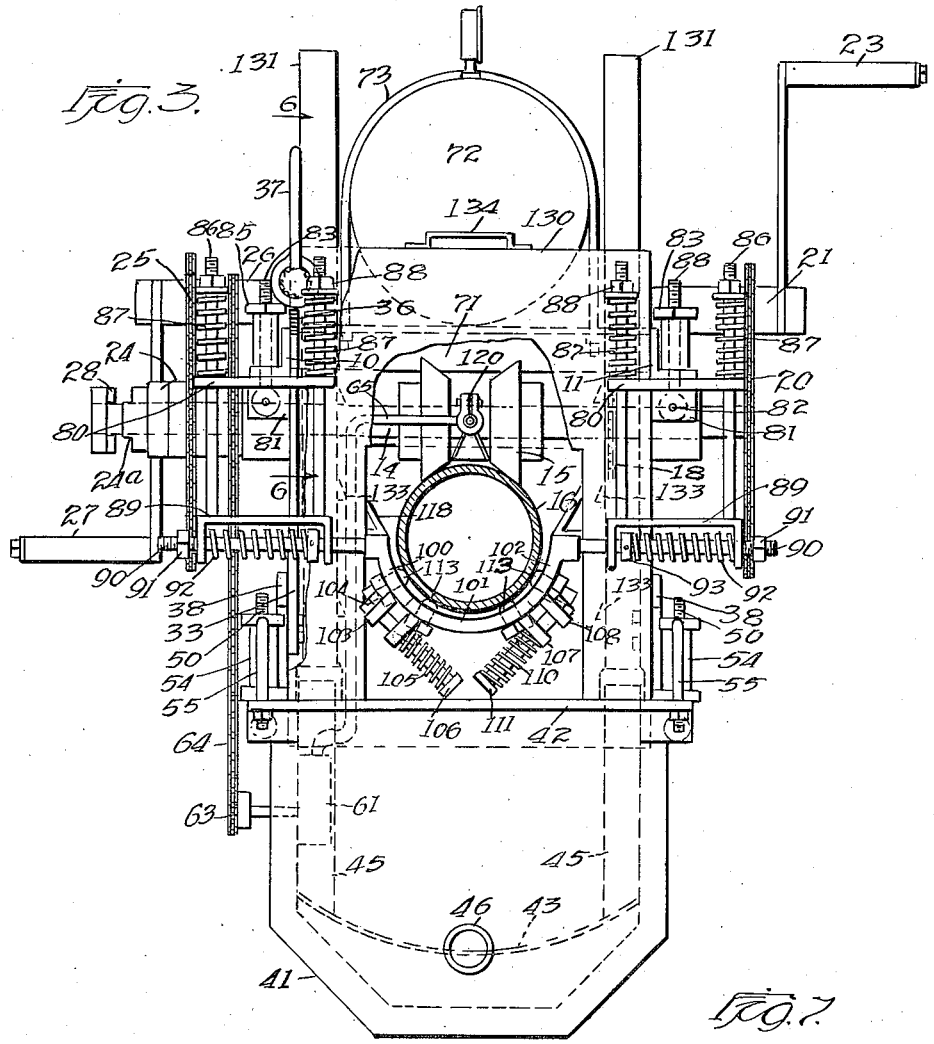
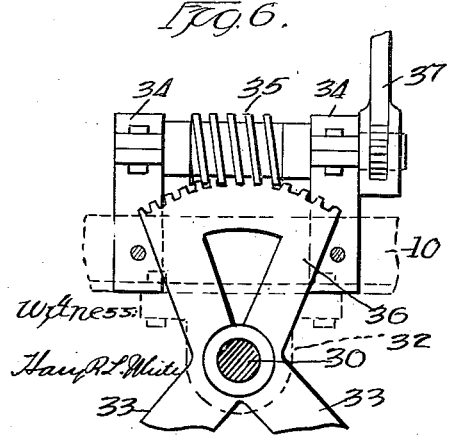
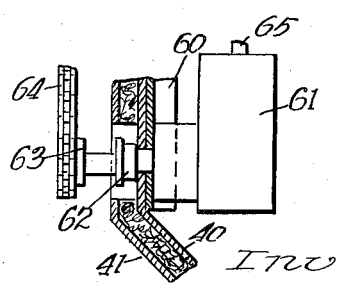

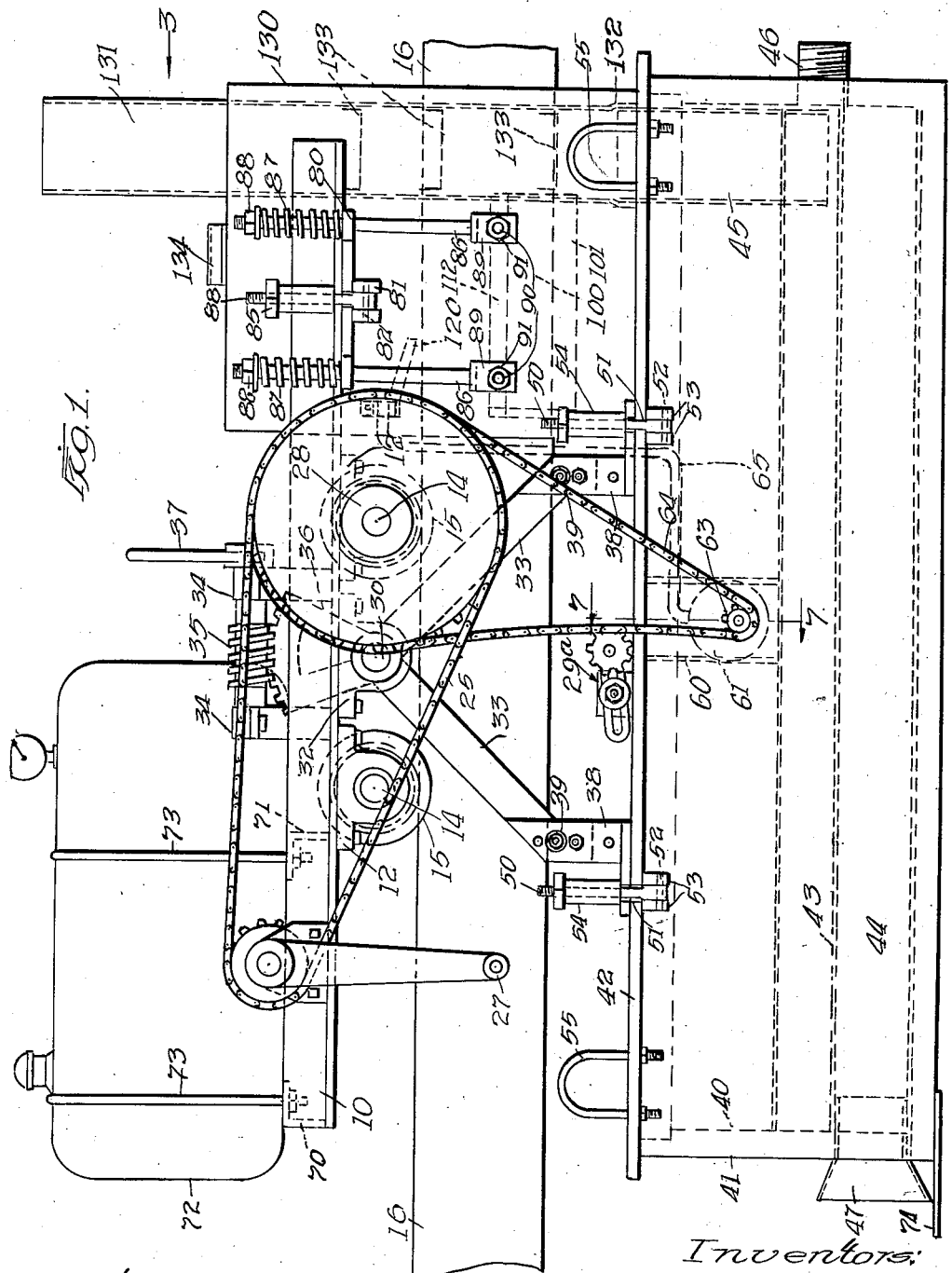

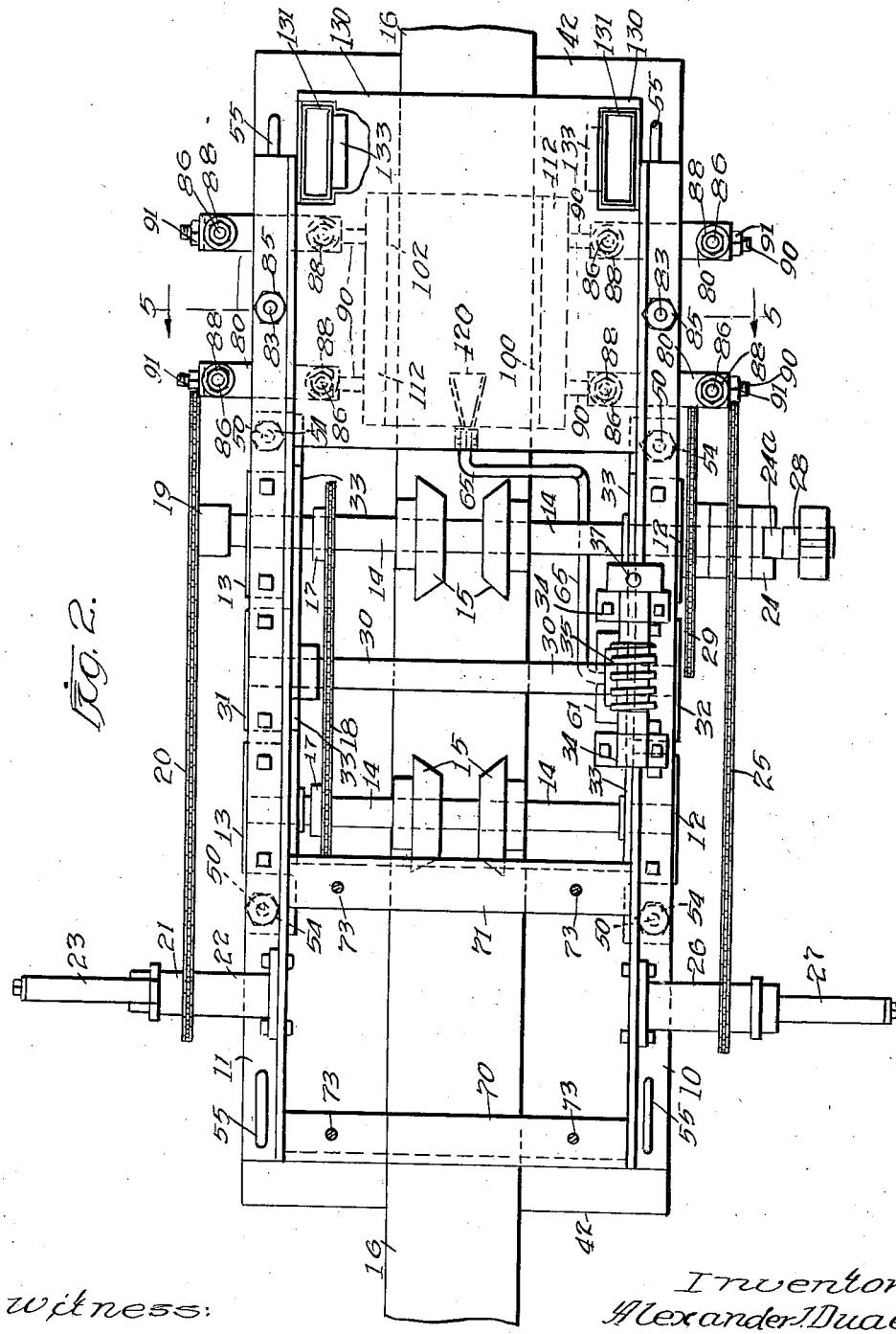

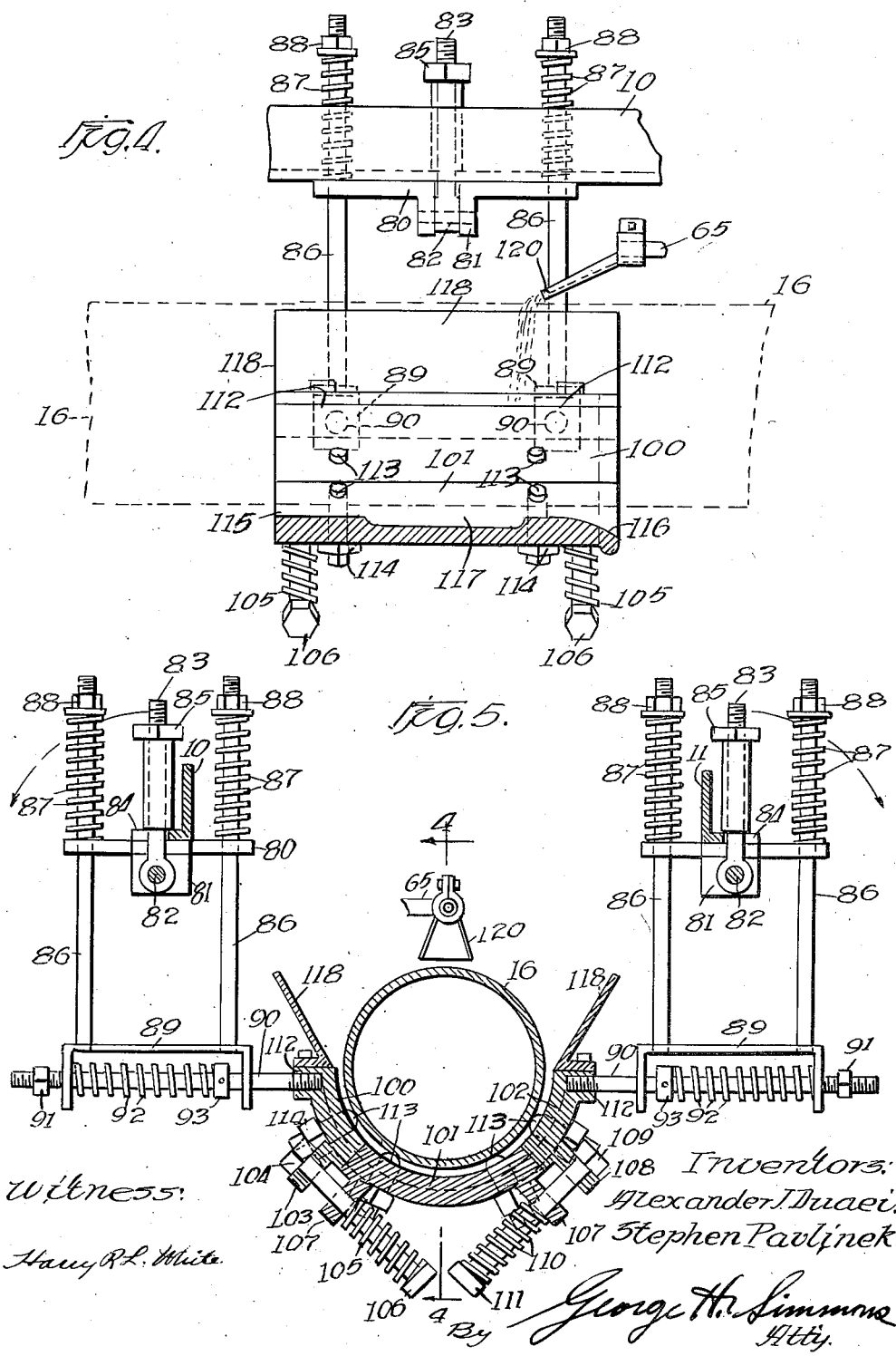

Patented Jan. 23, 1940

2,188,001

UNITED STATES PATENT OFFICE 2,188,001

PIPE LINE COATING MACHINE

Alexander J. Duaei, Lombard, and Stephen Pavlinek, Cicero, Ill.; said Pavlinek assignor to said Duaei Application October 18, 1937, Serial No. 169,544

12 Claims. (Cl. 91—30)

This invention relates to pipe line coating machines and has for its principal object the provision of a new and improved machine of this type. It is a main object of the invention to provide a machine adapted to be hung upon a pipe line and to travel therealong and to apply a hot coating material to the pipe line.

A further object of the invention is to provide a machine in which the kettle or tank in which the coating material is heated may be maintained horizontal even though the machine be travelling up or down hill.

Still another object of the invention lies in the provision of a new and improved coating shoe for use in a machine of this type.

It is still a further object of the invention to provide a machine which is light in weight and which may be readily put upon and removed from the pipe line when necessary to get around an obstruction.

Still another object of the invention resides in the provision of a machine which is of sturdy construction and capable of withstanding the hard usage to which it will be subjected when in use.

Still further objects of the invention, not specifically mentioned here, will be apparent from the detailed description and claims which follow, reference being had to the accompanying drawings in which a preferred embodiment of the invention is shown by way of example and in which:

Figure 1 is a side elvational view of the machine mounted upon a pipe line;

Figure 2 is a plan view of the machine shown in Figure 1;

Figure 3 is an end elevational view taken from the rear or trailing end of the machine;

Figure 4 is a fragmentary cross-sectional view through the coating shoe and mounting therefor, taken substantially along the line 4—4 of Figure 5;

Figure 5 is a transverse cross-sectional view through the coating shoe and mounting therefor taken substantially along the line 5—5 of Figure 2 looking in the direction of the arrows;

Figure 6 is a fragmentary detailed view of the tank supporting and adjusting means drawn to an enlarged scale;

Figure 7 is a fragmentary cross-sectional view taken substantially along the line 7—7 of Figure 1.

Pipe lines such as are used for conducting gas, oil or water are frequently protected against rust by the application of a coating material which is covered by a protective coating of fibrous material such as asbestos paper. Coating materials such as are used for this purpose may be divided into two main classes, the first, or so-called hot coat materials, being compounds which are solids at ordinary temperatures and are liquefied by an application of heat and applied to the pipe while in a liquid state. The second, or so-called grease type coating materials, never completely solidify and are of the consistency of thick cream at ordinary temperatures and may be applied to the pipe line cold.

The present invention relates particularly to a machine for applying to the pipe lines materials of the first class, that is, hot coat materials, although as will be readily apparent to those skilled in the art, certain features of the invention may be equally well put to other uses.

In the construction of a pipe line, the individual pipes are fitted together and coupled, either by welding or by the use of couplers, prior to being lowered into the ditch which is to receive them. After the pipe line has thus been formed of individual pipes and tested, a travelling crane is employed to raise the pipe line off of the ground and to lower it into the ditch. It is the practice to apply the coating and protective materials to the pipe line after it has been raised off of the ground by the travelling crane and immediately before it is lowered into the ditch.

It will be readily apparent that as the crane picks up the pipe lines the high point in the pipe line will be at the crane and the pipe line will slope downwardly therefrom both in front of and behind the crane. The pipe line coating machine is set on the pipe immediately back of the crane and on a section of the line which is sloped, so that even though the pipe line be crossing a flat horizontal territory, the coating machine will be travelling up hill as it moves along the pipe line.

The coating machine such as shown in the drawings, consists of a frame-work supported upon the pipe line by traction wheels which are adapted to be revolved by traction means supported upon the frame-work to move the machine along the pipe line. Suspended from the frame-work and beneath the pipe line is a tank or kettle which contains a fire-box and a quantity of coating material that has been liquified in readiness for application to the pipe. If the tank is to be maintained parallel to the pipe line, the liquid will flow toward the low end of the tank and it will be necessary to provide appreciable depth in the tank so that an adequate quantity of liquid may be maintained at all times. The greater the depth of the tank the greater the height to which the pipe line must be elevated by the crane and the greater the angle of slope of the pipe line.

The advantages of maintaining the tank as shallow as possible will be readily apparent to one skilled in the art, and in a machine built in accordance with the teachings and objects of our invention we have provided a mounting for the tank which permits it to be maintained horizontal at all times regardless of the slope of the pipe line over which the machine is travelling. This permits us to limit the depth of the tank to the minimum required to maintain a sufficient quantity of liquid coating material without danger of the hot coating material overflowing out of the end of the tank as the machine travels up hill.

Obviously when it is necessary to remove the machine from the pipe line such as will be the case when a valve housing or other obstruction is encountered or when the pipeline passes through a tunnel under a highway or the like, it is necessary to detach the tank from the frame-work so that the latter may be lifted off of the pipe line. It is highly desirable that the machine be capable of being taken off of the pipe line with a minimum of delay, and to this end in accordance with the teachings and objects of our invention, we have provided a mounting for the tank which is quickly detachable and attachable by the use of a minimum of tools.

Coating material which has been liquified in the kettle or tank of the machine is pumped to a position immediately over the pipe line and allowed to flow onto the pipe line and into a coating shoe which applies the material to the pipe in an even homogeneous coat of thickness which can be regulated to meet the required specifications. In the prior art of which we are aware, this result has been sought to be accomplished in a number of ways, each of which is possessed of advantages and disadvantages.

In certain instances the material is applied to the pipe line by a coating shoe which completely encircles the pipe and which is adapted to maintain the material hot enough to permit it to be applied to the pipe in a smooth homogeneous coating. A shoe of this type is disclosed and more fully described in the co-pending application of Mickelson and Duaei, Serial No. 165,647 filed September 25, 1937, to which reference is here made. A shoe of this type may be used in a machine of the class to which the present invention refers.

In the drawings we have shown a modified form of shoe which in certain instances may be used more advantageously than can a shoe of the above mentioned type. As shown in the drawings, the coating shoe consists of a semi-cylindrical member supported beneath the pipe and maintained at a fixed distance therefrom by adjustable means. The shoe is adapted to catch material which has been poured on the upper surface of the pipe and allowed to flow there-around and to bring the material so caught into intimate contact with the under-side of the pipe line so as to apply an even coating thereto. The supporting means which holds the shoe in the machine serves also to pull the shoe as the machine travels along the pipe line.

The welds or couplers which are used to attach together the individual pipes forming the pipe line, project slightly from the outer surface of the pipe line and therefore it is necessary that the coating shoe be capable of adapting itself to the larger diameters of the welds and couplings. Furthermore, as the traction wheels ride over such welds or couplings, the position of the frame relative to the pipe line will be altered and it is therefore necessary to permit the coating shoe to move a short distance relative to the frame so that it will be maintained in proper relation to the pipe line. Furthermore, since the shoe is supported from a frame-work that is over the pipe line and is disposed beneath the pipe line, it must be removed from the machine when the machine is being put upon or taken off of the pipe line, and this must be done with a minimum of effort. In a machine built in accordance with the teachings of our invention, the shoe is supported upon the frame-work which is located above the pipe line by a resilient, quickly detachable supporting means which permits limited movement of the coating shoe in all directions, so as to enable the coating machine to ride at variations in the spacings between the frame-work and the pipe line as encountered.

Construction of pipe lines frequently extends into cold weather and the pipe upon which the hot coating is to be applied will often times be at a rather low temperature. In order that the hot coat material may be properly applied to the pipe, it is necessary that the material be maintained at a temperature sufficiently high to maintain it in liquid state until it has been placed upon the pipe line. Little difficulty is experienced in maintaining the liquid in the tank at a sufficiently high temperature and in order to insure that the coating shoe will be at or above the melting temperature of the liquid, machines built in accordance with the teachings of our invention contain hoods or stoves which incase the coating shoes and through which are extended the flues leading from the fire-boxes under the kettles, the hot gases of combustion thereby being utilized to raise the temperature of the coating shoes and pipe lines engaged thereby so as to insure that the coating material will be liquid when applied to the pipe lines.

Referring now to the drawings in more detail, particularly Figures 1 and 2, it will be seen that the machine consists of a frame-work that is generally rectangular and is composed of side-rails 10 and 11 which are shown as angles disposed in a generally horizontal position above the pipe. Mounted upon the frame member 10 are journals 12 which are aligned with similar journals 13 mounted upon the frame member 11. These journals support cross-shafts 14 which carry traction wheels 15 that engage the pipe line 16 to support the frame-work thereon. The particular type of traction wheels used may be varied and there are a number of suitable wheels available upon the open market. The wheels are keyed to the shafts and may be adjusted there-along to accommodate the machines to pipe lines of various sizes. Shafts 14 also carry sprocket wheels 17 which are connected together by a chain 18 and are of the same diameter, so that as one shaft is driven the other shaft will move in the same direction at the same speed.

As will be best seen in Figure 2, the right-hand or trailing one of the two shafts 14 carries a sprocket wheel 19 which is connected by chain 20 to a sprocket wheel upon a crank-shaft 21, which crank-shaft is journaled in the suitable journal 22 mounted upon the frame member 11. The crank-shaft carries a crank-arm 23 which may be rotated to move the machine along the pipe line.

A second sprocket wheel 24 is mounted loosely upon the shaft 14 and connected to a second crank-shaft by chain 25, the second crank-shaft being journaled in a journal 26 mounted upon the frame member 10 and being equipped with a crank 27 by which the crank-shaft may be rotated. Sprocket wheel 24 carries a clutch member 24a which is adapted to receive a cooperating clutch member 28 that is keyed to the shaft 14 and slidable therealong. When the clutch members are in engagement, sprocket wheel 24 will be keyed to the shaft 14 to that the crank 27 may be turned to assist crank 23 in moving the frame-work along the pipe line. Cranks 23 and 27 may be replaced by a suitable source of power such as an internal combustion engine, in which case the driving arrangement will be altered to suit, in a manner well understood by one skilled in the art.

A second sprocket wheel 29 is fixed with respect to sprocket wheel 24 and adapted to be moved therewith, the sprocket wheel 29 being connected to the pump of the machine, as will presently appear.

Located upon the approximate median line of the frame-work is a cross-shaft 30 journaled in a journal 31 mounted upon the frame member 11 and in a journal 32, Figure 1, mounted upon the frame member 10. This shaft 30 serves as a support for the tank or kettle of the machine and carries generally A-shaped brackets or supports 33 which are two in number and are abutted against the inside faces of the side members 10 and 11 of the frame. As will be seen in Figures 2 and 6, frame member 10 also carries a pair of supports 34 in which is journaled a worm 35 that is engaged with a segment 36 keyed upon shaft 30 adjacent to one of the support brackets 33. The segment 36 may be formed integral with the brackets or may be a separate member as desired. The worm and segment arrangement shown forms a levelling means that is very advantageous since the worm cannot be rotated by pressure on the segment and as a result the tank is securely locked at all times, even when being adjusted to make it level.

A suitable turning means 37 is fixed upon the shaft of the worm 35 and is operable to rotate the worm thereby to rotate the shaft 30 at a slower rate of speed in the obvious manner. As shown, the turning means 37 consists of a ratchet wrench that is reversible so that the worm may be turned in either direction, wrenches of this type being readily available. A hand wheel may be substituted if desired.

Brackets 33 are equipped with generally L-shaped feet 38 which are provided with a plurality of holes through one of which is extended a bolt 39 that serves to attach the foot to bracket. By altering the position of the foot relative to the supports 33, the tank carried by the foot, as will presently appear, may be raised or lowered to adjust the machine so that it will accommodate pipe lines of various diameters.

The tank or kettle that is adapted to be suspended beneath the pipe line by the feet 38 may take any one of a number of forms within the teachings of our invention. As shown in the drawings, the tank consists of an inner shell 40 and an outer shell 41 which are spaced apart with the space therebetween filled with a suitable heat insulating material. Angle members 42 located at the top of the tank form a rectangular framework which serves as a mounting means as will presently appear. Located within the tank is a false bottom member 43 which serves as a bottom for the upper or kettle portion of the tank and as a roof for the lower or fire-box portion 44. Flue members 45 lead out of the fire-box portion and through the kettle portion, terminating at a point above the frame members 42. The kettle portion is provided with a drain tap 46 by which liquid may be removed from the kettle when it is desired to do so. The fire-box portion 44 is provided with a firing door 47.

Mounted upon the under-side of the outwardly extending flanges of frame members 42, are four identical mounting bolts 50 which extend through suitable slots 51 in the frame members. Each bolt 50 is mounted by a pivot 52 supported in brackets 53 on the under-side of the frame member. The lower portion of the feet 38 on the brackets 33 rest upon the top face of the frame members 42 and are slotted to permit the mounting bolts 50 to be swung on their pivots 52 into and out of vertical position. The mounting bolts 50 are threaded and provided wtih collared nuts 54 which are adapted to engage the upper face of the feet 38 to support the tank upon the frame work. When the nuts 54 are tightened, the tank is securely fixed on the brackets.

It will be readily apparent that when it is necessary to remove the tank from the frame-work, collared nuts 54 may be loosened a few turns and readily swung outwardly either by hand or by inserting a pry bar in the space between the collared portion of the nut and the vertical portion of the feet 38. The tank is thus detached from the frame-work.

Frame members 42 of the tank carry suitable eyelets shown as U-bolts 55 which are four in number and located at the corners of the tank. Chains from a crane may be hooked on to these eyelets to move the tank from one location to another, or a pipe may be threaded through the eyelets to permit the tank to be carried by four or more men.

Located within the kettle portion of the tank is a mounting base 60 which serves as a support for a pump 61 whose shaft projects through a liquid tight bushing 62, Figure 7, and terminates outside of the tank. A sprocket wheel 63 is keyed to this shaft and connected to the sprocket wheel 29, Figure 2, by a chain 64 so that as the sprocket wheel 29 is rotated, the pump will be driven to force hot liquid out of the kettle and through a pipe 65 upwardly and over the pipe line. The particular type of pump used for this purpose is not of the essence of the present invention and may be varied within the teachings of the invention. However, we have found that a positive displacement pump of the gear type is satisfactory for this purpose. The chain 29 is longer than is necessary to encircle the sprocket wheels and to span the space therebetween, so as to provide slack which permits the chain to be detached from the sprockets without uncoupling the chain. This slack is taken up by an adjustable idler sprocket 29a mounted upon a frame member 42 of the tank by a suitable arm. A cam lever or wing nut may be used to pivotally mount the arm on the frame, the sprocket being thereby made movable so that the slack in the chain may be taken up.

Frame members 10 and 11 are connected by cross-members 70 and 71, Figure 2, which serve as a support for a fuel tank 72, Figure 1, the tank being fixed upon the cross-members by suitable bands 73. Preferably, the tank 72 is a pressure tank that may be pumped up by suitable means not shown. The tank is partly filled with a volatile liquid such as gasoline, that feeds a burner, not shown, that is supported upon the mounting plate 74 on the bottom side of the tank and adapted to throw flames through the fire door 47 into the combustion chamber 44. Blow torches suitable for this purpose are old and well understood by those skilled in the art and since the particular type of blow torch used forms no essential part of the present invention, the torch has been omitted from the drawings to avoid an unnecessary complication thereof.

As will be seen in Figures 4 and 5, a coating shoe is mounted upon the frame members 10 and 11 by a mounting bracket consisting of plates 80 which are generally H-shaped as will be seen in Figure 2, and which contain pairs of depending brackets 81 which serve as supports for a pivot 82 that serves as a mounting for a bolt 83. The brackets 80 are slotted to permit the bolt 83 to travel in a limited path around its pivot 82.

Frame members 10 and 11 are slotted as shown at 84 and the bolts 83 are projected between these slots and extended above the frame member. The bolts are threaded and provided with collared nuts 85 which engage the upper surface of the frame member and when tightened serve to rigidly lock the plates 80 against the frame member.

In each of the four corners of the plates 80 are perforations through which are extended mounting rods 86 which extend above the plate 80 and are incased in coil springs 87 that rest upon the upper surface of the plate and against nuts 88 threaded upon the upper ends of the bars. Suitable washers are interposed between the nuts and the ends of the springs in accordance with established practice. The mounting rods 86 are thus supported upon plates 80 for limited longitudinal movement against the tension of springs 87.

The two bars 86 that are located at one end of the plate 80 are joined together at their bottom ends by a generally C-shaped bracket member 89 which has downwardly projecting legs that are perforated to receive a horizontally extended bar 90. The outward end of this bar is threaded to receive a nut 91. A coil spring 92 encircles the bar 90 and is abutted against one of the downwardly depending legs of the bracket 89 and against a collar 93 fixed upon the bar. Each of the mounting plates 80 carries two pairs of vertically disposed rods, each pair being joined together at their bottom ends by brackets which support horizontal bars 90, there being eight vertical rods 86 and four horizontal bars 90, which, with their co-operating brackets and springs, form a mounting means for the coating shoe.

The coating shoe shown in the drawings is of the general type disclosed in the above mentioned co-pending application excepting that the shoe shown is semi-cylindrical rather than cylindrical. As will be seen in Figure 5, the shoe consists of three sections, 100, 101 and 102, which together form a half cylinder. The adjacent sides of sections 100 and 101 are provided with bosses 103 which extend radially outwardly to receive a bolt 104 which is encircled by a spring 105 that is tensioned by a nut 106 to hold the two sections together. There are two bosses 103 and two bolts 104 located at opposite ends of the shoe. Section 101 also carries a boss 107 located adjacent the edge of the section engaged by section 102, and section 102 carries a cooperating boss 108, which bosses receive a bolt 109 that is encircled by a spring 110 that is tensioned by a nut 111 to hold the two sections together, the above mentioned parts being duplicated on the opposite ends of the shoe. Other forms of resilient means for holding the sections of the shoe together may be used in lieu of the above within the teachings of the invention.

Sections 100 and 102 each contain outwardly extending bosses 112 which are threaded to receive the horizontal bars 90 thereby to support the shoe in the supporting assembly. Section 100 also contains two threaded openings through which are projected round nose stud screws 113 that engage the pipe 16 to space the shoe section a fixed distance therefrom, the stud screws being locked by jam nuts. Section 101 contains two threaded openings at each end through which similar round nose stud screws are threaded, the four screws serving to space the section a fixed distance from the pipe, and section 102 contains two threaded openings, one at each end, through which similar stud screws are threaded to space that section a fixed distance from the pipe. The stud screws are preferably hardened so that they will not be worn away readily as the shoe is pulled along the pipe line.

The shoe thus formed contains a counter-bore 115, Figure 4, which is a section of a cylinder of diameter slightly greater than the outside diameter of the pipe. The shoe also contains a second counter-bore which is flared outwardly to form an entry port 116 leading into the shoe. The central section between counter-bores 115 and 116 is spaced away from the pipe a greater distance than the counter-bores to form a cavity or reservoir 117 which has a thickness radially of the pipe several times as great as the thickness of the coat of material that is to be put upon the pipe. It will be observed that the stud screws 113, by which the shoe is located with respect to the pipe, are projected through the shoe in the counter-bores rather than in the section therebetween. This insures that the counter-bores will at all times be a certain distance from the outside face of the pipe, and the thickness of the coating to be applied is thereby maintained uniform, as will hereinafter appear.

The upper edges of the shoe sections 100 and 102 are each provided with an apron 118 which extends upwardly and outwardly to form a funnel-like structure leading into the shoe, the aprons 118 extending the full length of the shoe.

Pipe 65 leading from the pump terminates above the pipe line 16 directly over the center of the same. Pipe 65 discharges into a fish-tail funnel 120 means which consists of a generally V-shaped plate having upstanding edge flanges and leading downwardly into juxtaposition to the top side of the pipe. Liquid discharged from the pipe 65 falls upon the fish-tail funnel 120 and spreads out thereon into a sheet which falls onto the surface of the pipe to apply the material thereto. Excess material flows around the pipe, is caught by the funnel aprons 118 and is conducted into the shoe to fill the cavity 117. The quantity of liquid delivered by the pipe 65 is sufficient to keep the cavity 117 full to overflowing, the excess liquid flowing out through the counter-bores 114 and falling back into the tank or kettle to be reheated. As the material flows through the counter-bores it will be applied to the pipe line, the thickness of the coating so applied depending upon the temperature of the material and the distance between the counter-bore 116 and the pipe.

In the drawings funnel means 120 consists of a single unit placed to discharge onto the pipe along a line slightly in advance of the center of the shoe, this arrangement being shown by way of example. We have found that under certain circumstances it is advantageous to use two fish-tail funnels 120, the second discharging nearer the trailing edge of the shoe than the first. This arrangement results in making two distinct applications of material to the top side of the pipe which is advantageous when a particularly thick coating is required.

The coating shoe is surrounded by a generally rectangular box-like hood 130, which rests upon the frame members 42 of the tank and extends upwardly inside the said frame members 10 and 11 of the machine. The hood contains end sections which are perforated to permit the pipe to pass through and slots for 80 but which are close enough to the pipe to effectively shield it. The hood carries flue members 131 which are joined to the flue member 45 in the kettle by suitable telescopic connection 132, and the flues 131 contain the plurality of louvres 133 located within the hood and through which gases of combustion may escape to aid in warming the area within the hood. The hood carries a removable cover with vents 134 through which these gases may escape.

In the operation of the device the frame is detached from the tank and set upon the pipe line with the traction wheels engaging the pipe to support the frame thereon. The tank is then attached to the depending supports 33 on the frame-work and adjusting means 37 operated to bring the tank into a horizontal position. The tank is filled with a solid coating material and the fuel tank with fuel. The heating means is then lighted and allowed to operate sufficiently long to bring the coating material in the tank up to the proper temperature. The coating shoe is attached to the frame and beneath the pipe line, the stud screws being adjusted to set the shoe to coat the pipe to the desired thickness. This may be done either before or after the heating means is lighted. After the adjustments are made the hood is put in place over the shoe.

As soon as the coating material is at the proper temperature, clutch members 24a and 28 are disengaged and crank 27 is operated to operate the pump thereby to pump a quantity of the liquid up into the shoe to heat the same. When the machine is thus warmed up in readiness for operation, the clutch members are engaged to key the sprocket wheel 24 to the shaft 14 and cranks 23 and 27 are rotated to cause the machine to travel along the pipe. The pump is simultaneously operated at a speed directly proportional to the speed of the travel of the machine along the pipe line and sufficiently high to insure that the coating shoe will at all times be maintained full to overflowing. The coating material is thus applied to the pipe line and smoothed out on the under-side thereof by the counter-bore section of the coating shoe. We have found that the natural flowing of the coating material over the top and sides of the pipe line leaves the material in a smooth coating of the desired thickness and that it is not necessary to treat this outer surface in order to put it in satisfactory condition.

When a weld or other outwardly projecting section of the pipe is encountered, the shoe is cammed open by the engagement of the projection with the tapered surfaces 116 of the shoe. As soon as the obstruction is passed, the springs 105 and 110 re-close the shoe.

As a curve is encountered in the pipe or as the frame of the machine is altered in its position relative to the pipe, the mounting rods and bars 86 and 90 and their cooperating springs re-adjust themselves so as to maintain the shoe aligned with the pipe and so as to permit the machine to travel along the pipe line without binding.

As the machine travels along the pipe line the slope of the same will vary and means 37 is adjusted from time to time to maintain the tank level. This may be done without stopping the machine since the tank is securely locked by the worm and segment even while adjustments are being made.

When it is necessary to remove the machine from the pipe line, idler 29a is loosened to put slack in chain 64 which is then uncoupled from the sprocket wheel 63, collar nuts 54 are loosened and disengaged from the mounting feet 38, and the tank lowered away from the hood and framework of the machine. The coating shoe is detached by operating collar nuts 85 and then the frame-work of the machine may be readily removed from the pipe line. The hood and flues carried thereby may be removed separately and probably will be removed before the tank is removed from the frame-work.

It will be apparent to one skilled in the art that we have devised a new and improved machine which is possessed of many advantages. It is a simple, sturdy construction and not likely to be damaged by the rough usage to which it will undoubtedly be subjected. The tank may be quickly brought into a horizontal position regardless of the position of the pipe line and when so set is locked automatically through the cooperation of the worm and segment. The half shoe and cooperating fish-tail spout function to apply a smooth coat of material of uniform thickness around the pipe line.

While we have chosen to show our invention by illustrating and describing a preferred embodiment of the same we have done so by way of example only and are not to be limited by the precise details shown, these may be modified by one skilled in the art.

What we consider new and desire to have protected by Letters Patent is pointed out in the appended claims.

What is claimed is:

1. In a coating machine for pipe lines, a frame, traction means adapted to support said frame upon a pipe line and operable to move the frame therealong, coating means on said frame, a tank disposed beneath said frame and pipe line, and means for mounting said tank upon said frame, said means being adjustable to maintain the tank horizontal when the machine is on an inclined pipe line.

2. In a coating machine for pipe lines, a frame, traction means adapted to support said frame upon a pipe line and operable to move the frame therealong, coating means on said frame, a tank disposed beneath said frame and pipe line, means on said frame for supporting the tank thereon and including adjustable means for maintaining the tank level, and quick detachable means on the tank engaging said mounting means for attaching the tank thereto.

3. In a coating machine for pipe lines, a frame, traction wheels journaled on said frame and engageable with a pipe line to support the frame thereabove, means on said frame for rotating said wheels to move the machine along the pipe line, a shaft journaled on the frame and extending across the pipe line, mounting brackets fixed upon said shaft and depending below the frame and pipe line, a tank fixed upon said brackets, means upon the frame for rotating said shaft to maintain said tank level, a coating shoe adapted to engage a pipe line, and means on said frame for supporting said shoe independently of said tank.

4. In a coating machine for pipe lines, a frame, traction wheels journaled on said frame and engageable with a pipe line to support the frame thereabove, means on said frame for rotating said wheels to move the machine along the pipe line, a shaft journaled on the frame and extending across the pipe line, mounting brackets fixed upon said shaft and depending below the frame, a tank fixed upon said brackets, means upon the frame for rotating said shaft to maintain said tank level, a coating shoe adapted to engage a pipe line, and resilient means on said frame for supporting said shoe for limited universal movement with respect to the frame and independently of said tank.

5. In a coating machine for pipe lines, a frame, traction wheels journaled on said frame for supporting the same above the pipe line, a shaft journaled on said frame and extending across the pipe line, a pair of mounting brackets fixed on said shaft and depending from said frame on opposite sides of the pipe line, a tank disposed beneath said pipe line, means on the tank engaging said mounting brackets for supporting the tank on said frame-work, and means for rotating said shaft to maintain the tank level and for locking the shaft thereby to lock the tank with respect to the frame.

6. In a coating machine for pipe lines, a frame, traction wheels journaled on said frame for supporting the same above the pipe line, a shaft journaled on said frame and extending across the pipe line, a pair of mounting brackets fixed on said shaft and depending from said frame on opposite sides of the pipe line, a tank disposed beneath said pipe line, means on the tank engaging said mounting brackets for supporting the tank on said frame-work, a segment keyed upon said shaft, and a worm gear journaled upon said frame and engaging said segment and operable to rotate said shaft to maintain said tank level and to lock the shaft to maintain the tank fixed with respect to the frame.

7. In a pipe line coating machine, the combination of means for delivering a liquid coating material to a point above a pipe line, a fish-tail spout cooperating with said means to spread said liquid over the top and sides of the pipe, a semi-cylindrical shoe disposed directly underneath said spout for catching the liquid running from the sides of said pipe, means for forming a pool of the material so caught for applying the same to the bottom half of the pipe, and means disposed beneath the pipe for catching liquid that leaks from said shoe and returning the same to said delivering means.

8. In a pipe line coating machine, a frame, means for supporting the frame on the top side of pipe line, a coating shoe disposed on the bottom side of the pipe line, means for supporting said shoe upon said frame in engagement with said pipe line, said means permitting limited universal movement of the shoe as a unit with respect to the frame, and quick detachable means on said frame for attaching said supporting means thereto.

9. In a pipe line coating machine, a frame, a shoe, supporting means for said shoe comprising perforated plates fixed upon said frame, vertical rods extending through the perforations in said plate, means including springs engaging the rods and plates for supporting the rods for longitudinal movement through the plates, horizontal rods engaging the shoe, and means connecting said horizontal rods to said vertical rods, said means permitting universal movement of the horizontal rods, and means permitting quick detachment of said mounting means from said frame.

10. A coating shoe comprising three sections which together form a semi-cylinder, bosses on said sections, rod means fixed in the bosses of one section and extending through the bosses of the adjacent section, spring means surrounding said rod means and engaging said latter bosses to hold the sections together, a plurality of round end studs threaded through each of said sections and adapted to engage a pipe to adjustable position the shoe with respect thereto, and apron means on the free edges of said shoe extending upwardly and outwardly therefrom.

11. A coating shoe comprising a plurality of sections fitted together to form a hollow semi-cylinder having an inner face containing end sections having diameters smaller than the diameter of the central section, one of said end sections being flared outwardly to form an entrance port for the shoe, spring pressed means on the outside of said shoe for yieldably holding said sections together, and means projected through the end sections of the shoe and adapted to engage a pipe line and position the shoe with respect thereto.

12. In a coating machine adapted to be moved along a pipe line to apply a coating material thereto, a coating shoe comprising a semi-cylindrical member having an inner face with end sections of diameter less than the diameter of the central section, mounting means for holding said shoe against the under-side of the pipe line under tension and for moving it therealong, and means in the end sections of said shoe bearing against the pipe line to fix the position of the shoe relative to the pipe line.

ALEXANDER J. DUAEI.
STEPHEN PAVLINEK.